US011654556B2

(12) United States Patent
Hane et al.

(10) Patent No.: US 11,654,556 B2
(45) Date of Patent: May 23, 2023

(54) DETERMINATION APPARATUS FOR DETERMINING AN OPERATION OF AN INDUSTRIAL ROBOT

(71) Applicant: FANUC CORPORATION, Yamanashi (JP)

(72) Inventors: Mikito Hane, Yamanashi (JP); Takashi Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 276 days.

(21) Appl. No.: 16/738,006

(22) Filed: Jan. 9, 2020

(65) Prior Publication Data

US 2020/0223065 A1    Jul. 16, 2020

(30) Foreign Application Priority Data

Jan. 16, 2019    (JP) .............................. JP2019-005531

(51) Int. Cl.
*B25J 9/16*    (2006.01)
*G05B 13/02*    (2006.01)

(52) U.S. Cl.
CPC ............. *B25J 9/1633* (2013.01); *B25J 9/163* (2013.01); *B25J 9/1674* (2013.01); *G05B 13/0265* (2013.01); *B25J 9/1687* (2013.01)

(58) Field of Classification Search
CPC ........ B25J 9/1633; B25J 9/163; B25J 9/1602; B25J 9/1638; B25J 9/1641; B25J 9/1687; B25J 9/1674; G05B 13/0265
See application file for complete search history.

(56) References Cited

U.S. PATENT DOCUMENTS

| 9,671,777 | B1 * | 6/2017 | Aichele ................. B25J 9/1666 |
| 9,840,007 | B1 * | 12/2017 | Kuffner ............... G05D 1/0088 |
| 10,766,137 | B1 * | 9/2020 | Porter ..................... B25J 9/161 |
| 2007/0210740 | A1 | 9/2007 | Sato et al. |
| 2017/0028562 | A1 | 2/2017 | Yamazaki et al. |

(Continued)

FOREIGN PATENT DOCUMENTS

| DE | 102016009030 A1 | 2/2017 |
| JP | S61134807 A | 6/1986 |

(Continued)

OTHER PUBLICATIONS

Tadanobu Inoue, Giovanni De Magistris, Asim Munawar, Tsuyoshi Yokoya, "Deep Reinforcement Learning for High Precision Assembly Tasks," Sep. 22, 2017, arXiv (Year: 2017).*

*Primary Examiner* — Ian Jen
*Assistant Examiner* — Karston G. Evans
(74) *Attorney, Agent, or Firm* — Hauptman Ham, LLP

(57) ABSTRACT

A determination apparatus acquires, as acquired data, the state of force and moment applied to a manipulator and the state of the position and the posture in an operation when a force control of an industrial robot is carried out, and creates an evaluation function that evaluates the quality of the operation of the industrial robot based on the acquired data. Then, it creates determination data for the acquired data using the evaluation function, and creates state data used for machine learning based on the acquired data. Then, it generates a learning model for determining a quality of an operation of the industrial robot using the state data and the determination data.

6 Claims, 9 Drawing Sheets

(56) References Cited

U.S. PATENT DOCUMENTS

| | | | | |
|---|---|---|---|---|
| 2017/0315540 A1* | 11/2017 | Nishioka | ............... | G05B 19/406 |
| 2018/0099407 A1* | 4/2018 | Nakamura | ............. | G06N 20/00 |
| 2018/0136628 A1* | 5/2018 | Tezuka | ................. | G05B 19/402 |
| 2019/0028043 A1* | 1/2019 | Oho | ........................ | H02P 6/17 |
| 2019/0184564 A1* | 6/2019 | Muraoka | ................ | B25J 9/1687 |
| 2019/0197396 A1* | 6/2019 | Rajkumar | ................ | G06N 3/08 |
| 2019/0375112 A1* | 12/2019 | Mariyama | .............. | B25J 9/1697 |

FOREIGN PATENT DOCUMENTS

| | | | |
|---|---|---|---|
| JP | H11188680 | A | 7/1999 |
| JP | 2007237312 | A | 9/2007 |
| JP | 2012125852 | A | 7/2012 |
| JP | 201730135 | A | 2/2017 |

\* cited by examiner

FEED DIRECTION

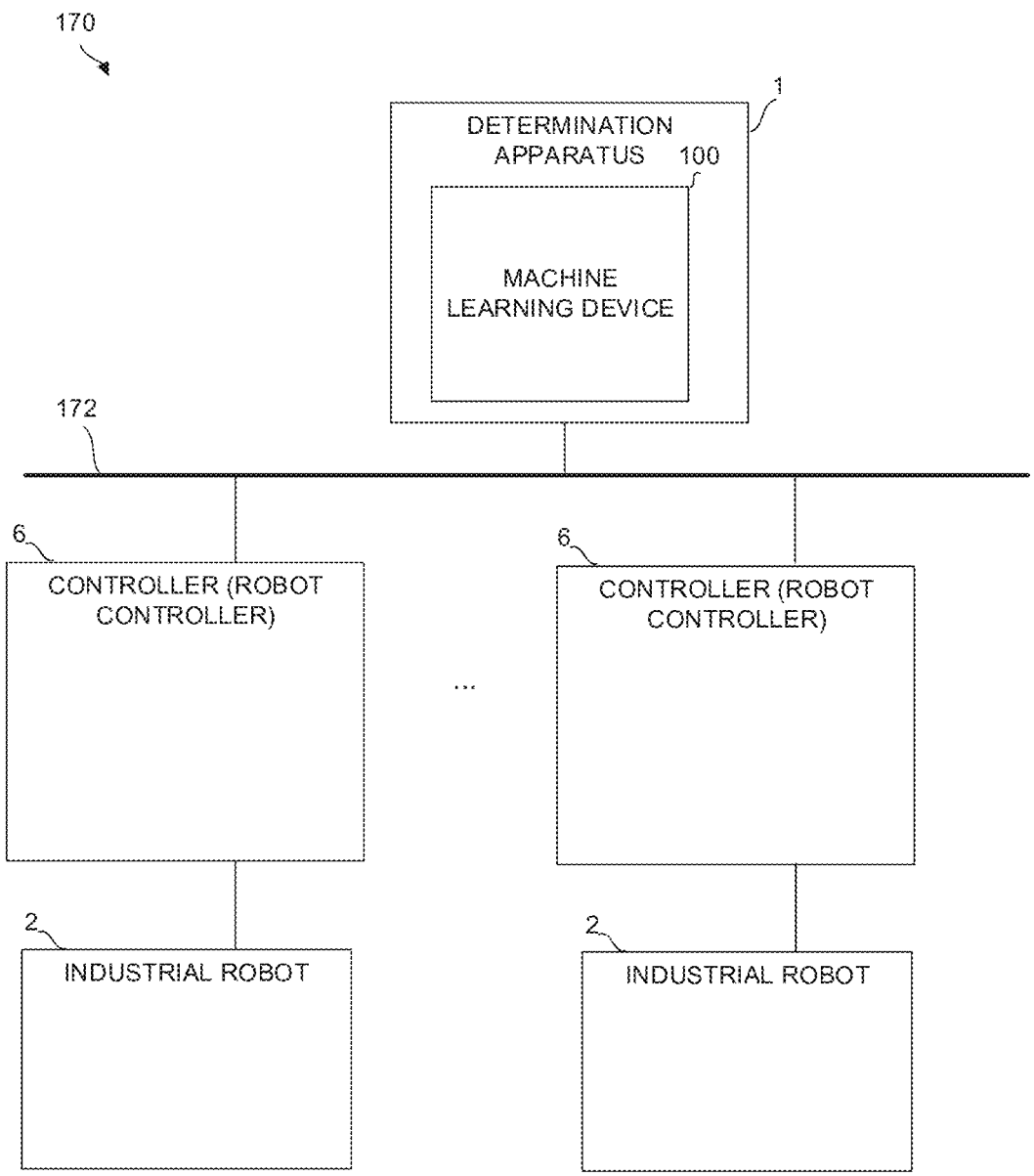

DETERMINATION APPARATUS FOR DETERMINING AN OPERATION OF AN INDUSTRIAL ROBOT

RELATED APPLICATIONS

The present application claims priority to Japanese Patent Application Number 2019-005531 filed Jan. 16, 2019, the disclosure of which is hereby incorporated by reference herein in its entirety.

BACKGROUND OF THE INVENTION

1. Field of the Invention

The present invention relates to a determination apparatus, and more particularly to a determination apparatus that automatically determines state data related to force control of a robot.

2. Description of the Related Art

Operations for precisely fitting components together and operations such as gear phase alignment, deburring, and polishing are carried out by a robot with a force sensor. Such an operation is achieved by controlling a force (or performing force control) in a predetermined direction to a desired value by causing the robot to grip a component or a tool. As such a force control method, impedance control, damping control, hybrid control, and the like are known, and in any of these methods, it is necessary to manually set an appropriate control gain. Methods for automatically adjusting the control gain are publicly known (see, for example, Japanese Patent Application Laid-Open No. 2007-237312).

As described above, although the methods of setting the control gain in force control are publicly known, other parameters such as an appropriate pressing force, a traveling speed, a traveling direction, and the like depend on adjustment by the operator. There is a difference between a skilled operator and an inexperienced operator in his/her judgment regarding the suitability of such parameter adjustment. In particular, if an inexperienced operator makes a determination of parameter adjustment, it may take time to make a determination due to trial and error, or he may make a determination different from the result of actual parameter adjustment, which may cause a problem in subsequent operations based on the determination result. For example, if machine learning is carried out based on such an erroneous determination result, there will be a problem that an accurate learning result (learning model) cannot be obtained.

SUMMARY OF THE INVENTION

Therefore, the present invention provides a determination apparatus that assists an inexperienced operator in his/her making determination in the substantially same way as a skilled operator does in parameter adjustment of force control.

In one aspect of the present invention, the above problem is solved by creating, in the adjustment of each parameter related to the control of a manipulator of an industrial robot, an evaluation function that outputs the result of determination related to success/failure of an operation with respect to the data acquired from the operation at the time of execution of the force control of the industrial robot. By using an evaluation function that outputs a determination result according to a predetermined standard, the determination apparatus configured as described above uses the evaluation function to carry out the determination of the operation with respect to the data acquired at the time of operation of the industrial robot, and hence it is possible to carry out a stable operation determination without resort to operator's experience.

The determination apparatus according to the present invention makes a determination of the operation of an industrial robot that has a function of detecting force and moment applied to a manipulator. The determination apparatus includes: a data acquisition unit that acquires, as acquired data, at least a state of force and moment applied to a manipulator and a state of a position and a posture in an operation when a force control of the industrial robot is carried out; an evaluation function creation unit that creates an evaluation function that evaluates the quality of the operation based on the acquired data; a determination data creation unit that creates determination data for the acquired data using an evaluation function created by the evaluation function creation unit; a preprocessing unit that creates state data used for machine learning based on the acquired data; and a learning unit that generates a learning model for determining the quality of an operation of the industrial robot by the use of the state data and the determination data.

The data acquisition unit may by configured to create temporary determination data in which the quality of the operation is determined according to the time taken for the operation, and the evaluation function creation unit may create the evaluation function based on the created temporary determination data.

Since the determination apparatus according to the present invention has the above configuration, even an inexperienced operator can make a determination on the quality of an operation of an industrial robot according to a predetermined standard in the parameter adjustment of the force control.

BRIEF DESCRIPTION OF THE DRAWINGS

FIG. 9 is a schematic functional block diagram of a system according to a fourth embodiment.

DETAILED DESCRIPTION OF THE PREFERRED EMBODIMENTS

Figure 1:
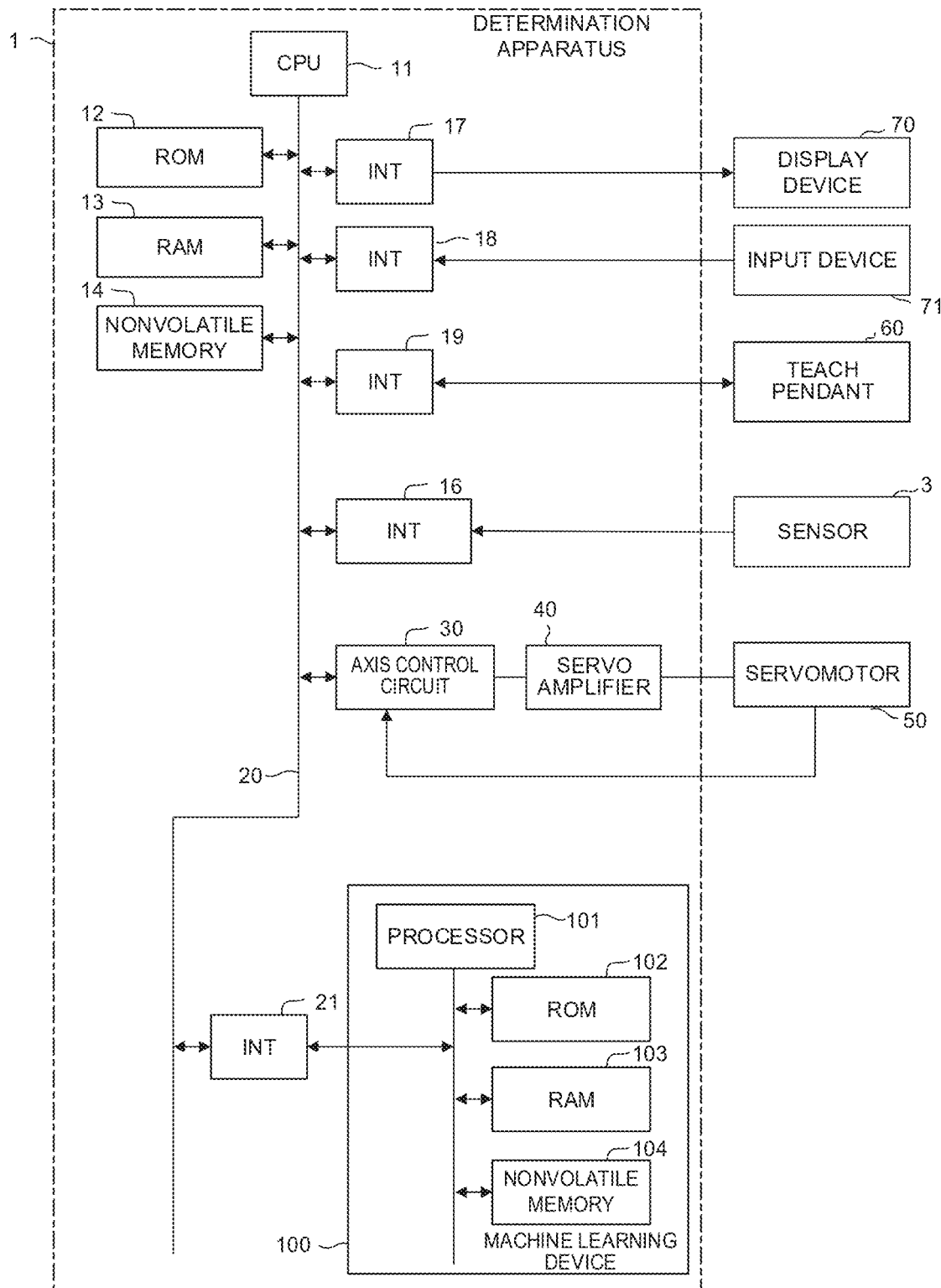
FIG. 1 is a schematic hardware configuration diagram of a determination apparatus according to an embodiment.

FIG. 1 is a schematic hardware configuration diagram showing a main part of a controller that includes a machine learning device according to an embodiment. A determination apparatus 1 according to the present embodiment can be mounted as a controller that controls an industrial robot that carries out fitting or assembling of components, deburring, and the like.

A CPU 11 included in the determination apparatus 1 according to the present embodiment is a processor that controls the determination apparatus 1 as a whole. The CPU 11 reads, via a bus 20, a system program stored in an ROM 12 and controls the overall determination apparatus 1 according to the system program. An RAM 13 temporarily stores temporary calculation data, various data, and the like that have been input by the operator via a teach pendant 60 or an input device 71.

A nonvolatile memory 14 is constituted by, for example, a memory, a solid state drive (SSD), or the like that is backed up by a battery (not shown), and maintains a storage state even when the power of the determination apparatus 1 is turned off. The nonvolatile memory 14 stores teaching data that has been input from the teach pendant 60 through an interface 19, data that has been input from the input device 71 through an interface 18, a program for controlling an industrial robot that has been input via an interface (not shown), data detected by a sensor 3 attached to the industrial robot (force or moment applied to the manipulator) through an interface 16, data detected by a servomotor 50 that drives an axis of the industrial robot (current value, position, speed, acceleration, torque, and the like of the servomotor 50), data that has been read via an external memory device (not shown) or network, and the like. The programs and various data stored in the nonvolatile memory 14 may be developed in the RAM 13 at the time of execution or use. Various system programs (including system programs for controlling interaction with a machine learning device 100 described below) for executing processing or the like related to control of the robot and teaching of the teaching position are written in advance in the ROM 12.

Various data that has been read into the memory, data that has been obtained as a result of execution of the program or the like, data that has been output from the machine learning device 100 described later, and the like are output via an interface 17 and displayed on a display device 70. The input device 71 that includes a keyboard and a pointing device passes, via an interface 18 to the CPU 11, commands, data, and the like based on an operation by the operator.

The teach pendant 60, which is a manual data input device that includes a display, a handle, a hardware key, and the like, displays information received from the determination apparatus 1 via an interface 19, and passes to the CPU 11 pulses, commands, and various data that has been input from the handle, the hardware key, and the like.

An axis control circuit 30 for controlling an axis such as a joint included in the industrial robot receives an axis movement command amount from the CPU 11 and outputs an axis command to a servo amplifier 40. The servo amplifier 40 receives this command and drives the servomotor 50 that moves the axis of the robot. The servomotor 50 of the axis incorporates a position/speed detector, and feeds back a position/speed feedback signal from the position/speed detector to the axis control circuit 30, thereby carrying out feedback control of the position/speed. Only one axis control circuit 30, one servo amplifier 40, and one servomotor 50 are shown in the hardware configuration diagram of FIG. 1. However, actually, the number of each of them to be provided is the same as the number of axes provided in the robot to be controlled. For example, in a case of a robot that has six axes, the axis control circuit 30, the servo amplifier 40, and the servomotor 50 are provided for each of the axes.

An interface 21 is an interface for connecting the determination apparatus 1 and the machine learning device 100. The machine learning device 100 includes a processor 101 that controls the overall machine learning device 100, an ROM 102 that stores a system program and the like, an RAM 103 that carries out a temporarily storage in each processing related to machine learning, and a nonvolatile memory 104 that is used for storing a learning model and the like. The machine learning device 100 can observe each piece of information (force or moment applied to the manipulator, and current value, position, speed, acceleration, torque, and the like of the servomotor 50) that can be obtained by the determination apparatus 1 via the interface 21. Upon reception of an instruction to change a force command or a torque command that is output from the machine learning device 100, the determination apparatus 1 corrects a control command of the robot based on the program or teaching data.

Figure 2:
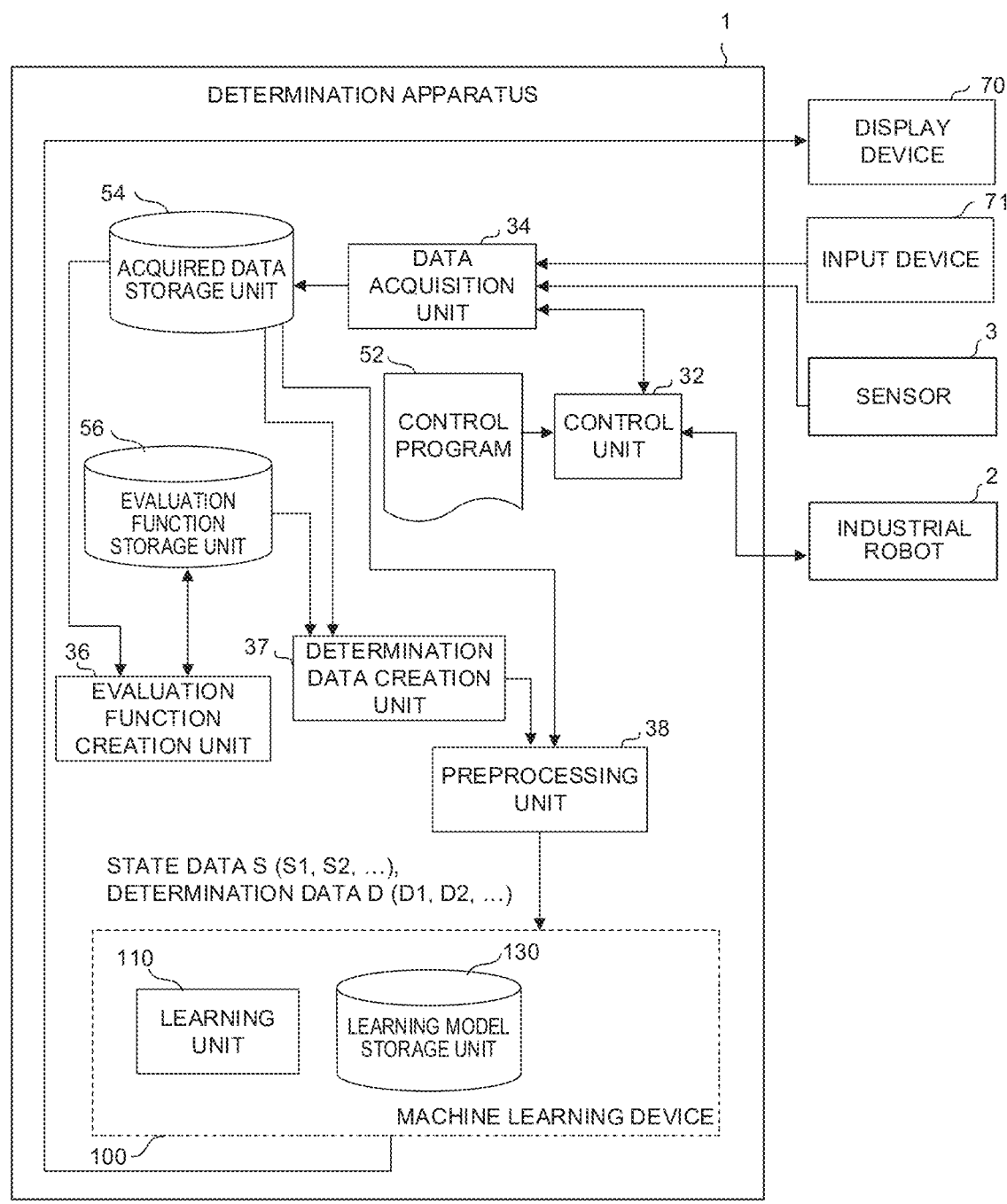
FIG. 2 is a schematic functional block diagram of a controller according to a first embodiment.

FIG. 2 is a schematic functional block diagram of the determination apparatus 1 and the machine learning device 100 according to the first embodiment.

The determination apparatus 1 of the present embodiment includes a configuration required in a case where the machine learning device 100 carries out learning (learning mode). Each functional block shown in FIG. 2 is achieved by the CPU 11 of the determination apparatus 1 shown in FIG. 1 and the processor 101 of the machine learning device 100 that executes respective system programs and controls the operations of the respective units of the determination apparatus 1 and the machine learning device 100.

The determination apparatus 1 of the present embodiment includes a control unit 32, a data acquisition unit 34, an evaluation function creation unit 36, a determination data creation unit 37, and a preprocessing unit 38. The machine learning device 100 included in the determination apparatus 1 includes a learning unit 110. The nonvolatile memory 14 is provided with an acquired data storage unit 54 that stores data acquired from an industrial robot 2, the sensor 3, and the like, and an evaluation function storage unit 56 that stores an evaluation function used for evaluation for the acquired data. The nonvolatile memory 104 of the machine learning device 100 is provided with a learning model storage unit 130 that stores a learning model constructed by machine learning by the learning unit 110.

The control unit 32 has a function for general control required for controlling each unit of the industrial robot 2, such as controlling the operation of the industrial robot 2 based on a control program 52 stored in the nonvolatile memory 104, controlling the industrial robot 2 based on a control operation of an operation panel (not shown) by the operator or a control program stored in the nonvolatile memory 14, and outputting command data, as an amount of change in axial angle for each control cycle, to a motor that drives the axis in a case where movement of each axis (joint) of the industrial robot 2 is commanded by the control program 52. Furthermore, the control unit 32 acquires motor state amounts (motor current value, position, speed, acceleration, torque, and the like) of each motor included in the industrial robot 2 and outputs them to the data acquisition unit 34.

The data acquisition unit 34 acquires various data from the industrial robot 2, the sensor 3, the input device 71, and the like. The data acquisition unit 34 acquires, for example, a command by a program for controlling the industrial robot, force and moment applied to the manipulator of the industrial robot 2, and the current value, position, speed, acceleration, torque, and the like of the servomotor 50, which drives the axis of the industrial robot 2, and stores them in the acquired data storage unit 54. The data acquisition unit 34 may acquire data detected from the sensor 3 and data related to the servomotor 50 as time series data, or may acquire data from another computer via an external storage device (not shown) or a wired/wireless network 7.

In a step (evaluation function creation mode) in which the determination apparatus 1 creates an evaluation function by the evaluation function creation unit 36, the data acquisition unit 34 creates temporary determination data for classifying acquired data in accordance with a predetermined standard with respect to acquired data that has been acquired from the industrial robot 2, the sensor 3, the input device 71, and the like, and stores, in the acquired data storage unit 54, the created temporary determination data and the acquired data that are associated with each other as data for creating an evaluation function.

Figure 3:
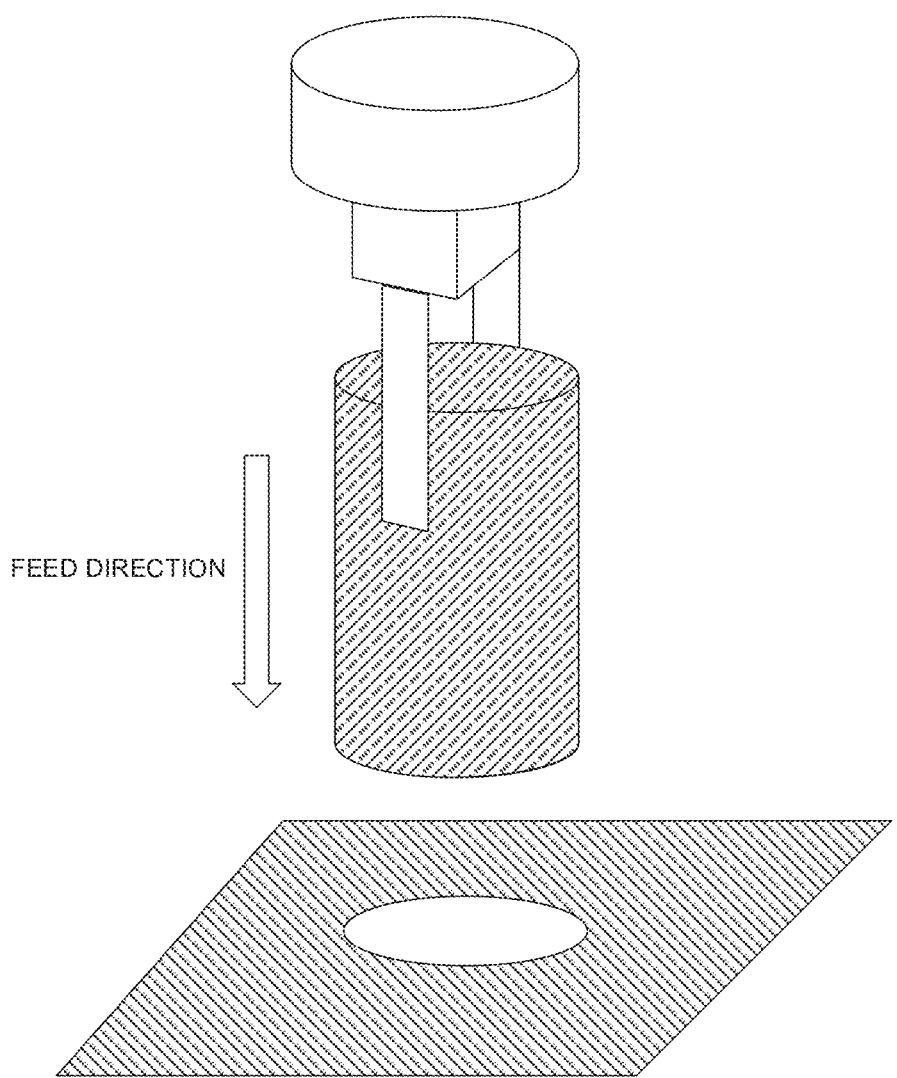
FIG. 3 is a view showing an example of a fitting operation of a component by an industrial robot.

As an example of the temporary determination data created by the data acquisition unit 34, FIG. 3 shows a case in which the quality of cylinder fitting, used for insertion of a cylinder, in which a cylinder is inserted into a cylindrical hole, wherein a threshold value $t_{lim1}$<threshold value $t_{lim2}$<threshold value $t_{lim3}$ is determined in advance, and it is considered to be success (high) if the time t taken until the cylinder is fitted to the target depth is less than $t_{lim1}$; it is considered to be success (intermediate) if the time t taken until the cylinder is fitted to the target depth is equal to or higher than $t_{lim1}$ and less than $t_{lim2}$; it is considered to be success (low) if the time t taken until the cylinder is fitted to the target depth is equal to or higher than $t_{lim2}$ and less than $t_{lim3}$; and it is considered to be failure if fitting to the target depth until the time $t_{lim3}$ fails.

In this manner, in accordance with a predetermined standard, the data acquisition unit 34 classifies the acquired data into a plurality of categories such as success and failure, and further classifies each category of success and failure into a plurality of subcategories. In the above example, the category of success is further classified into subcategories on a time basis. However, for example, the category of success may be classified into subcategories that emphasize carefulness (classification according to the maximum value of the force applied to the robot tip portion), or the category of failure may be classified according to the degree of gouging (classification according to the maximum value of the force applied to the robot tip portion) and the accuracy (accuracy of the position of the robot tip portion). Such a standard may be appropriately set by a skilled operator, for example.

The data acquisition unit 34 stores, in the acquired data storage unit 54, acquired data that has been acquired from the industrial robot 2, the sensor 3, the input device 71, and the like, as acquired data used for machine learning, in the step (learning mode) in which the determination apparatus 1 carries out machine learning by the machine learning device 100.

Based on the evaluation function creation data acquired by the data acquisition unit 34 and stored in the acquired data storage unit 54, the evaluation function creation unit 36 creates an evaluation function for outputting the determination data for the acquired data and stores it in the evaluation function storage unit 56. The evaluation function created by the evaluation function creation unit 36 includes, for example, a function that calculates a predetermined evaluation value using each data value of the acquired data as an argument, and an evaluation expression that derives determination data from the evaluation value. The determination data to be output by the evaluation function created by the evaluation function creation unit 36 is used for machine learning by the machine learning device 100 together with the state data created from the acquired data.

An example of the evaluation function created by the evaluation function creation unit 36 will be described. For example, a cylinder fitting in which a cylinder is inserted into a cylindrical hole, used for inserting a cylinder, as shown in FIG. 3 is assumed. In a case of such a cylinder fitting, the data acquisition unit 34 can acquire, as the acquired data, the time taken from the start to the end of the operation, the transition of six components of the force data at the tip portion of the robot, the transition of six components of the position data (which can be calculated from the transition of the position data of each servomotor), and the like from the industrial robot 2, the sensor 3, and the like. As state data S used for machine learning in the machine learning device 100, for example, six components ($F_x$, $F_y$, $F_z$, $M_x$, $M_y$, $M_z$) of force and moment data and six components ($P_x$, $P_y$, $P_z$, $P_w$, $P_d$, $P_r$) of position and posture data in time series of the robot tip portion obtained from a force detection unit (force sensor) and a position detection unit (pulse coder), respectively, as the sensor 3, are used, and it is decided that the determination data D contains values of success (high), success (intermediate), success (low), and failure.

At this time, for example, a template of a function that calculates an evaluation value as exemplified by Equation (1) and a template of an evaluation expression as exemplified by Equation (2) that are shown below are stored in advance in the evaluation function storage unit 56. In Equation (1), $Q_k$ represents the evaluation value, t represents the time, Fp represents the maximum value of the pressing force, Po represents the amount of change in posture, Pd represents the amount of change in position, and $w_{k1}$, $w_{k2}$, $w_{k3}$, and $w_{k4}$ represent coefficients of weight for the respective data. In Equation (2), $lim_0$, $lim_1$, $lim_2$, and $lim_3$ represent threshold values for determining the classification of the determination data.

$$Q_k = t \times w_{k1} + Fp \times w_{k2} + Po \times w_{k3} + Pd \times w_{k4} \quad (1)$$

where $w_{k1} + w_{k2} + w_{k3} + w_{k4} = 1$

Failure: if $Q_k > lim_0$

Success (low): if $Q_k > lim_1$

Success (intermediate): if $Q_k > lim_2$,

Success (high): if $Q_k > lim_3$, (2)

where $lim_3 < lim_2 < lim_1 < lim_0$

The evaluation function creation unit 36 creates an evaluation function by determining the coefficients and threshold values of the weights in Equations (1) and (2) described above. More specifically, the time t, the maximum value Fp of the pressing force, the change amount Po of the posture, and the change amount Pd of the position, which are calculated based on the acquired data included in the respective evaluation function creation data acquired by the data acquisition unit 34 and stored in the acquired data storage unit 54, are applied to Equation (1), and the weighting coefficients and threshold values are determined so that the respective evaluation values $Q_k$ calculated at that time match the temporary determination data included in the evaluation function creation data. The evaluation function creation unit 36 may determine the weighting coefficients by a publicly known statistical method such as correlation analysis and regression analysis. As for the threshold value, according to the distribution of the evaluation values of each acquired data in the adjacent categories, the evaluation function creation unit 36 may determine its boundary value as a threshold value.

The determination data creation unit 37 creates determination data for the acquired data for machine learning stored in the acquired data storage unit 54 using the evaluation function created by the evaluation function creation unit 36 and stored in the evaluation function storage unit 56. The determination data created by the determination data creation unit 37 is used for creation of the learning data by the preprocessing unit 38.

The preprocessing unit 38 creates learning data used for learning by the machine learning device 100, on a basis of the acquired data for machine learning that is acquired by the data acquisition unit 34 and the determination data that is created by the determination data creation unit 37 for the acquired data. The preprocessing unit 38 creates state data that is obtained by converting (digitizing, sampling, and the like) the data acquired by the data acquisition unit 34 into a unified format handled by the machine learning device 100.

The state data S created by the preprocessing unit 38 may include, for example, force state data S1 that includes information related to the force applied to the manipulator of the industrial robot 2 and position state data S2 that includes information related to the position of the manipulator. In such a case, the force state data S1 includes at least force in the feed direction applied to the manipulator of the industrial robot 2, and may further include a force applied in a direction other than the feed direction and moment of force. The force state data S1 may be detected by the sensor 3 installed in the manipulator of the industrial robot 2, or may be comprehensively obtained from electric current or the like flowing in the servomotor 50 that drives each axis of the industrial robot 2. The position state data S2 includes at least control commands such as a speed command, a force command, and a torque command in the feed direction of the manipulator as an adjustment action of the control commands (speed command, force command, torque command, and the like) in the feed direction of the manipulator carried out in the state of the force of the force state data S1, and may further include a control command in a direction other than the feed direction.

For the determination data D used as learning data by the preprocessing unit 38, the determination data created by the determination data creation unit 37 may be used as it is.

The learning unit 110 carries out machine learning using the data created by the preprocessing unit 38. The learning unit 110 generates a learning model in which a determination on the quality of an operation of the industrial robot 2 with respect to the operation state adjusted by the operator is learned by a publicly known machine learning method such as supervised learning, and stores the generated learning model in the learning model storage unit 130. Examples of the method of the supervised learning carried out by the learning unit 110 include the multilayer perceptronn method, the recurrent neural network method, the Long Short-Term Memory method, and the convolutional neural network method.

The learning unit 110 is capable of carrying out supervised learning, with respect to the state data S created based on the acquired data, using learning data in which the determination data D created using the evaluation function by the determination data creation unit 37 based on the acquired data is used as label data, and capable of generating, as a learning model, a determination boundary for success/failure (that is, the success/failure of the adjustment operation by the operator) of the operation of the industrial robot 2 and a determination boundary for the degree of success and the degree of failure. Using the learning model generated in this manner, a determination unit 120 to be described later is, based on the data acquired at the time of operation of the industrial robot 2, capable of determining success/failure of the operation and the degree of success and the degree of failure, and capable of calculating the determination result.

The determination apparatus 1 that includes the above configuration is capable of creating an evaluation function used for determining the operation of the industrial robot 2 based on the data acquired at the time of operation of the industrial robot 2. The evaluation function created by the determination apparatus 1 is used to create the determination data for the data acquired at the time of operation of the industrial robot 2, and is capable of outputting a determination result of the operation with respect to the data acquired at the time of operation of the industrial robot 2 according to the predetermined evaluation standard (standard for evaluation by a skilled worker), and hence it is possible to create stable determination data for the operation of the industrial robot 2 without resort to operator's experience.

Figure 4:
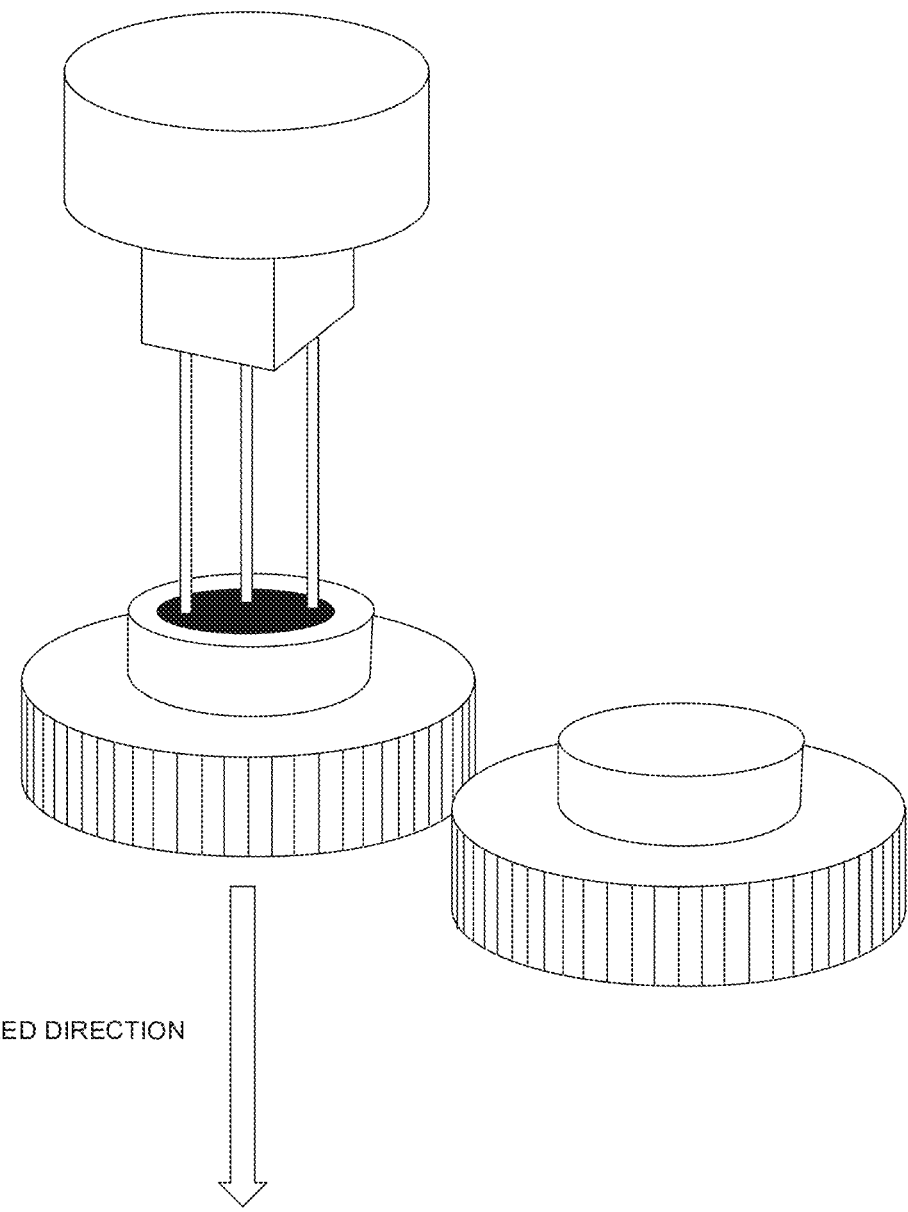
FIG. 4 is a view showing an example of an assembly operation of gears by an industrial robot.
Figure 5:
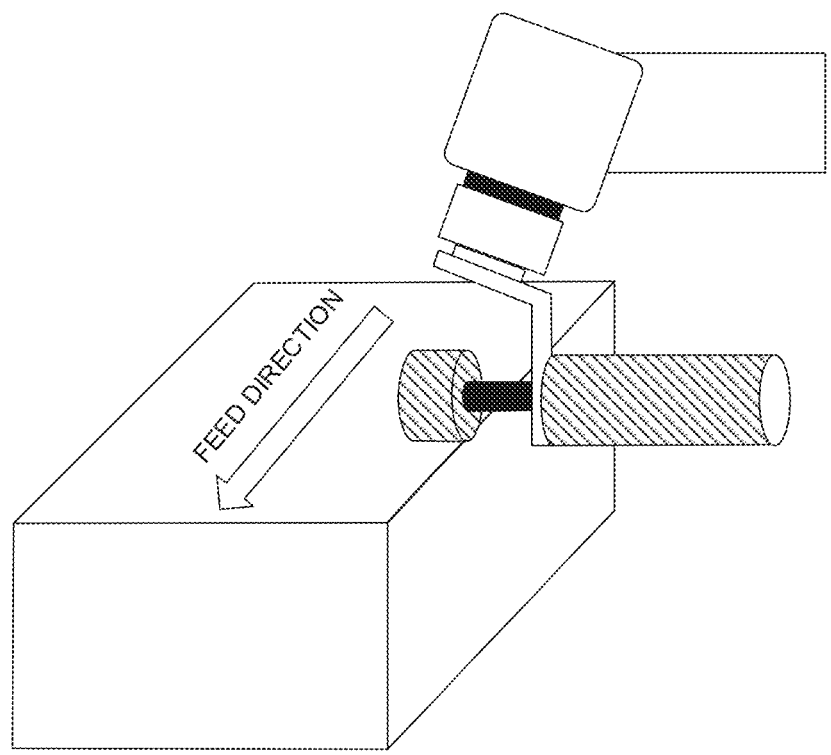
FIG. 5 is a view showing an example of deburring and polishing operations of a workpiece by an industrial robot.

In addition to the fitting operation illustrated in FIG. 3, the determination apparatus 1 of the present embodiment can also be applied to, as shown in FIG. 4, for example, an operation of assembling gears by grasping a gear with a manipulator mounted on the industrial robot 2 and aligning the phase of the gear with respect to another gear, and, as shown in FIG. 5, an operation of deburring or polishing a workpiece with a polishing tool mounted on the industrial robot 2 instead of the manipulator.

As a modification of the present embodiment, in addition to the force state data and the position state data acquired from the industrial robot 2 and the sensor 3, various data such as the mass of the tool mounted to the tip portion of the robot, the gap distance between the workpiece and the tool, the coefficient of friction, the temperature, and the force sensor characteristics may be added, as the state data S used for learning by the learning unit 110, to the state data S to carry out machine learning.

Figure 6:
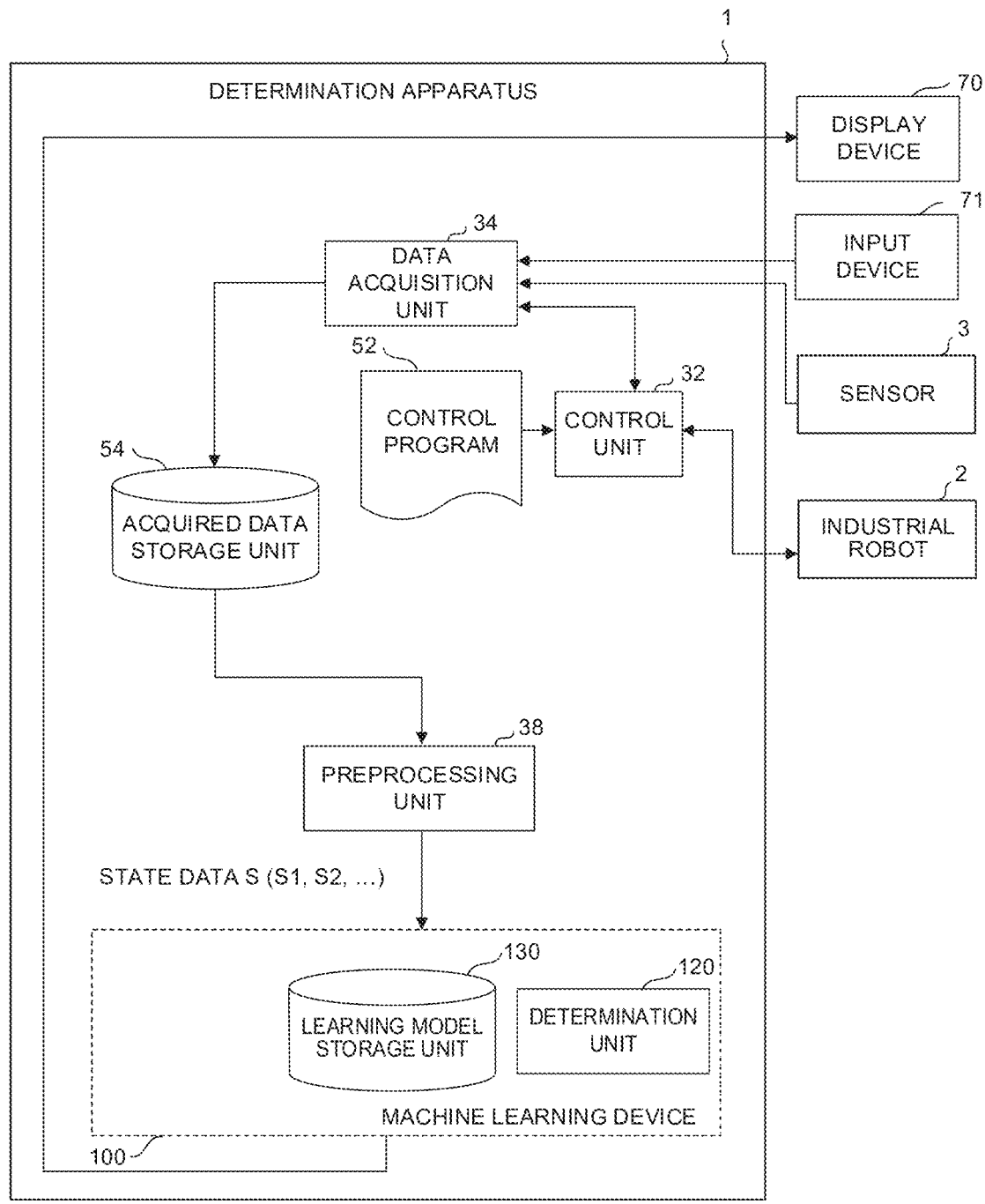
FIG. 6 is a schematic functional block diagram of the controller according to a second embodiment.

FIG. 6 is a schematic functional block diagram of the determination apparatus 1 and the machine learning device 100 according to the second embodiment. The determination apparatus 1 of the present embodiment includes a configuration required in a case where the machine learning device 100 carries out estimation (estimation mode). Each of the functional blocks shown in FIG. 6 is achieved by the CPU 11 of the determination apparatus 1 shown in FIG. 1 and the processor 101 of the machine learning device 100 executing respective system programs and controlling the operations of the respective units of the determination apparatus 1 and the machine learning device 100.

The determination apparatus 1 of the present embodiment includes the control unit 32, the data acquisition unit 34, and the preprocessing unit 38. The machine learning device 100 of the determination apparatus 1 includes the determination unit 120. The nonvolatile memory 14 is provided with the acquired data storage unit 54 that stores acquired data used for determination of the operation of the industrial robot 2 by the machine learning device 100. The nonvolatile memory 104 of the machine learning device 100 is provided with the learning model storage unit 130 that stores a learning model constructed by machine learning by the learning unit 110.

The data acquisition unit 34 according to the present embodiment stores, in the acquired data storage unit 54, the acquired data that has been acquired from the industrial robot 2, the sensor 3, the input device 71, and the like as acquired data used for the determination of the operation of the industrial robot 2, in the step (determination mode) in which the determination apparatus 1 carries out machine learning by the machine learning device 100.

The control unit 32 according to the present embodiment includes the same function as the control unit 32 in the first embodiment.

The preprocessing unit 38 according to the present embodiment creates the state data S used for determination of the operation of the industrial robot 2 by the machine learning device 100, based on the acquired data acquired by the data acquisition unit 34 and stored in the acquired data storage unit 54. The preprocessing unit 38 creates data obtained by converting (digitizing, sampling, and the like) the acquired data that has been acquired by the data acquisition unit 34, for example, into a unified format handled by the machine learning device 100.

The determination unit 120 determines the operation of the industrial robot 2 which uses the learning model stored in the learning model storage unit 130, based on the state data S created by the preprocessing unit 38. In the determination unit 120 of the present embodiment, the state data S that has been input from the preprocessing unit 38 is input to the learning model (with the parameters that have been determined) generated by the learning unit 110, thereby determining and outputting success/failure of the operation of the industrial robot 2, the degree of success, the degree of failure, and the like. The result that has been determined by the determination unit 120 may be output to and displayed on the display device 70 or transmitted and output to a host computer, a cloud computer, or the like via a wired/wireless network (not shown) for use.

In the determination apparatus 1 that includes the above configuration, the determination unit 120 carries out determination of the operation of the industrial robot 2 using the acquired data that has been acquired from the industrial robot 2. The learning model stored in the learning model storage unit 130 is created by learning using the determination data created with a predetermined standard by the evaluation function created by the evaluation function creation unit 36, and hence the determination unit 120 that uses the learning model is capable of making a highly accurate determination of the operation of the industrial robot 2 according to the basis of the predetermined standard.

Figure 7:
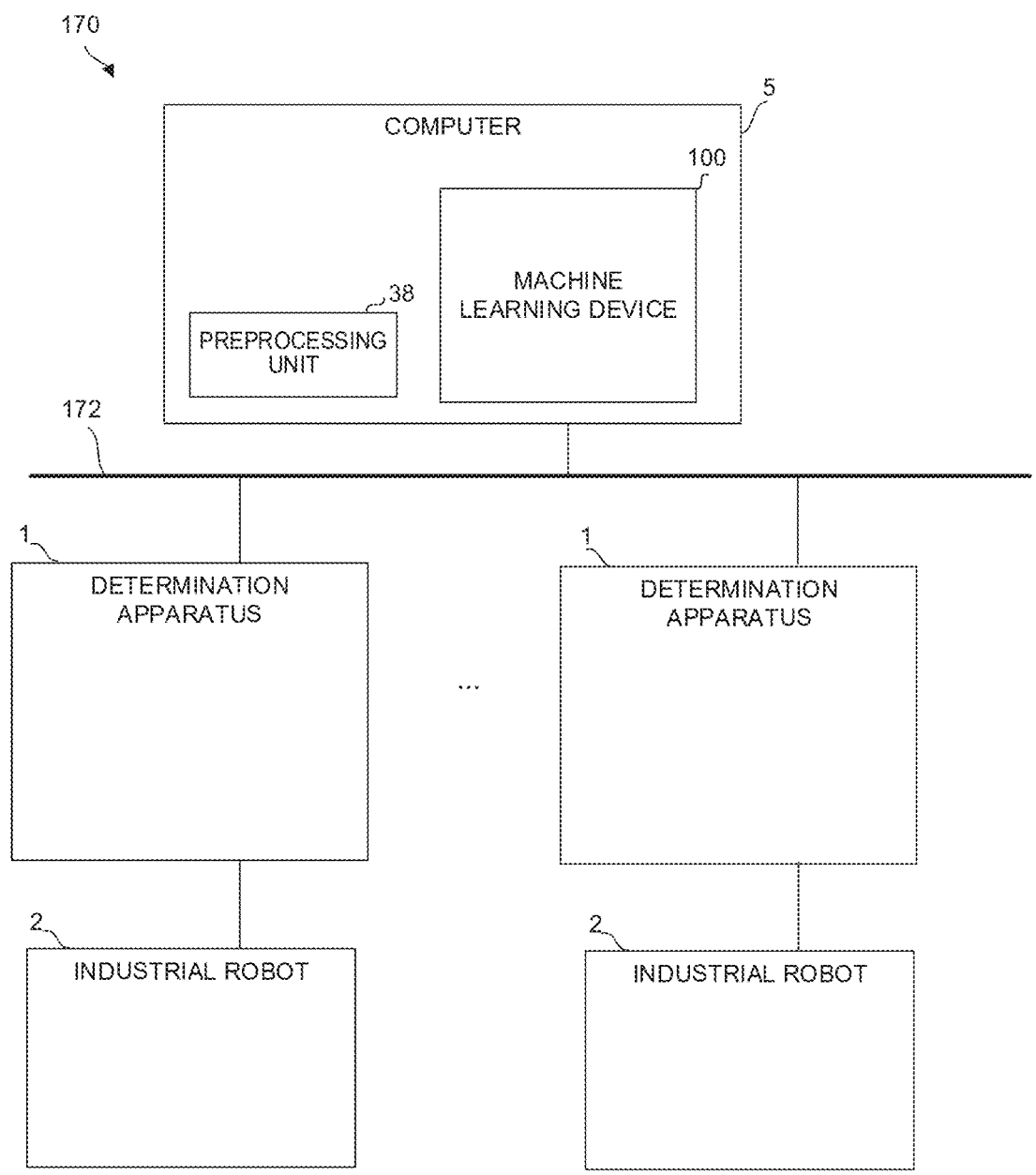
FIG. 7 is a schematic functional block diagram of a system according to a third embodiment.

FIG. 7 shows a system 170 according to the third embodiment that includes determination apparatuses 1. The system 170 includes at least one machine learning device 100 mounted on a computer 5 such as a cell computer, a fog computer, a host computer, and a cloud server, at least one determination apparatus 1 mounted as a controller (an edge computer) that controls the industrial robot 2, and a wired/wireless network 172 that connects the computer 5 and the determination apparatus 1 to each other.

The determination apparatus 1 according to the present embodiment is different from the determination apparatuses 1 according to the first and second embodiments in that the preprocessing unit 38 and the machine learning device 100 are not included in the determination apparatuses 1, and instead, the preprocessing unit 38 and the machine learning device 100 are disposed on the computer 5 connected via the network.

In the system 170 that has the above configuration, the computer 5 that includes the machine learning device 100 collects, via the network 172, acquired data acquired at the time of operation of the industrial robot 2 from each of the determination apparatuses 1 and determination data (created by the determination data creation unit 37), carries out machine learning using the acquired data and the determination data that has been collected, and generates a learning model (operation mode corresponding to that of the first embodiment).

The computer 5 that includes the machine learning device 100 receives the acquired data acquired at the time of operation of the respective industrial robots 2 from the respective determination apparatuses 1 via the network 172, carries out determination of the operation of the respective industrial robots 2, and returns the determination result to the determination apparatus 1 (operation mode corresponding to that of the second embodiment).

In the system according to the present embodiment, the machine learning device 100 is disposed on the computer 5 as a fog computer provided for the plurality of industrial robots 2 (the determination apparatus 1) as an edge computer, for example, and determination of the operation of the individual industrial robots 2 (the determination apparatuses 1) can be made in a centralized manner on the computer 5, so that it is not necessary to prepare the machine learning device 100 for each determination apparatus 1, and hence the operating cost of the machine learning device 100 can be reduced.

Figure 8:
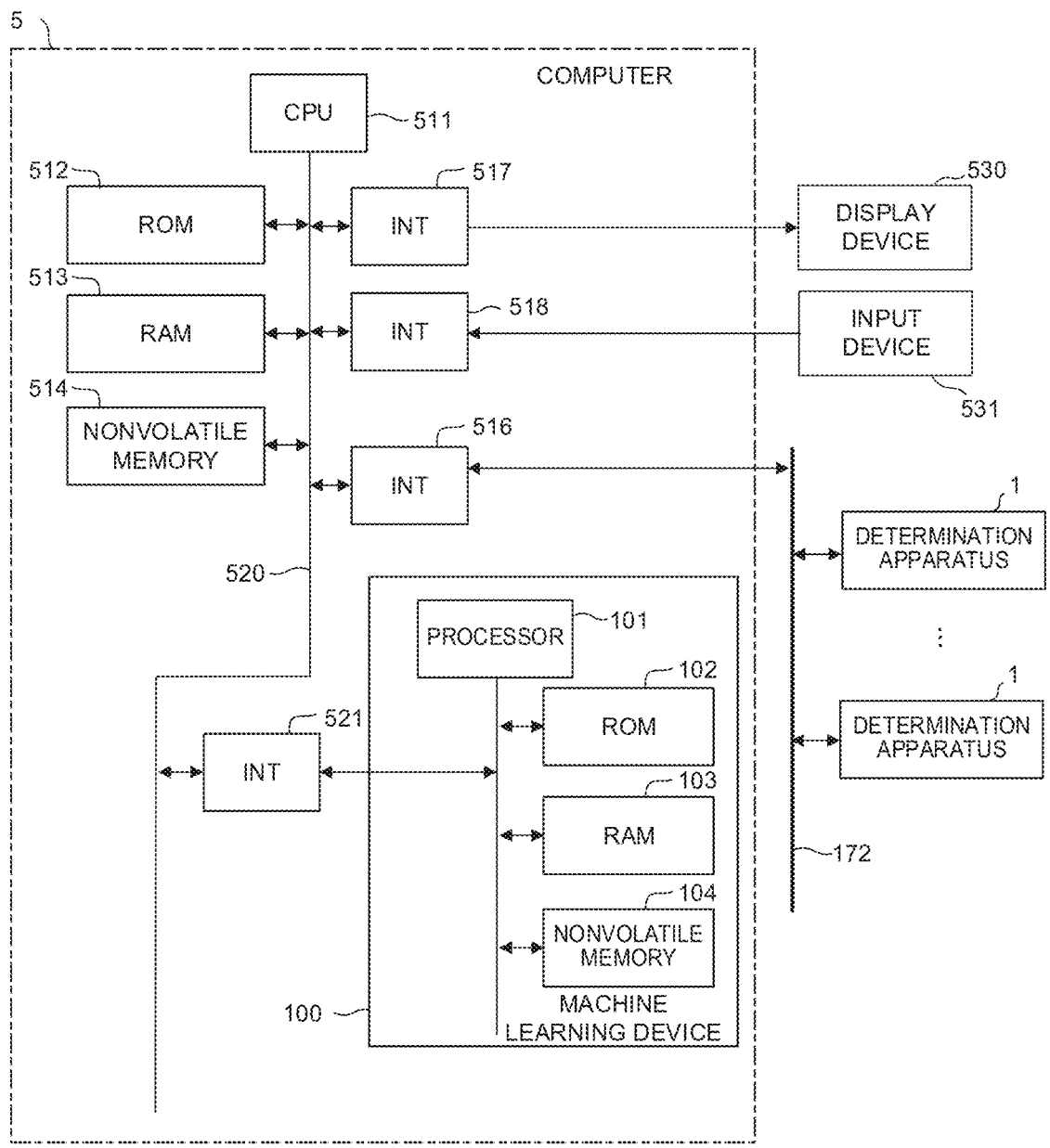
FIG. 8 is a schematic hardware configuration diagram of a computer according to an embodiment.

FIG. 8 is a schematic hardware configuration diagram of the computer 5 shown in FIG. 7.

A CPU 511 included in the computer 5 is a processor that controls the computer 5 as a whole. The CPU 511 reads, via a bus 520, a system program stored in an ROM 512 and controls the overall computer 5 according to the system program. An RAM 513 temporarily stores temporary calculation data, various data, and the like that has been input by the operator via an input device 531.

A nonvolatile memory 514 is constituted by, for example, a memory, a solid state drive (SSD), or the like that is backed up by a battery (not shown), and maintains a storage state even when the power of the computer 5 is turned off. The nonvolatile memory 514 stores a setting area in which setting information related to the operation of the computer 5 is stored, data that has been input from the input device 531, data acquired from each determination apparatus 1, data that has been read via an external storage device (not shown) or a network, and the like. The programs and various data stored in the nonvolatile memory 514 may be developed in the RAM 513 at the time of execution or use. A system program including a publicly known analysis program for analyzing various types of data has been written in advance in the ROM 512.

The computer 5 is connected with the network 172 via an interface 516. At least one determination apparatus 1, another computer, and the like are connected to the network 172, and exchange data with the computer 5.

Data that has been read into the memory and data that has been obtained as a result of execution of a program or the like are output and displayed on a display device 530 via an interface 517. The input device 531 that includes a keyboard and a pointing device passes, via an interface 518 to the CPU 511, commands, data, and the like based on an operation by the operator.

The machine learning device 100 has the same hardware configuration as that described with reference to FIG. 1.

FIG. 9 shows the system 170 according to the fourth embodiment that includes the determination apparatus 1. The system 170 includes the determination apparatus 1 mounted on a computer such as a cell computer, a fog computer, a host computer, and a cloud server, a controller 6 (an edge computer) that controls the industrial robot 2, and the wired/wireless network 172 that connects the determination apparatus 1 and the controller 6 to each other.

In the system 170 that has the above configuration, the determination apparatus 1 collects, via the network 172, acquired data acquired at the time of operation of the industrial robot 2 from each of the controllers 6, and creates an evaluation function that is common to the operations of the plurality of industrial robots 2 using the acquired data that has been collected. In addition, the determination apparatus 1 collects, via the network 172, acquired data acquired at the time of operation of the industrial robot 2 from each of the controllers 6, carries out machine learning using the acquired data that has been collected, and generates a learning model (in operation mode corresponding to that of the first embodiment).

Furthermore, the determination apparatus 1 receives the acquired data acquired at the time of operation of the respective industrial robots 2 from the respective controllers 6 via the network 172, carries out determination of the operation of the respective industrial robots 2, and returns the determination result to the controller 6 (in operation mode corresponding to that of the second embodiment).

In the system according to the present embodiment, the determination apparatus 1 as a fog computer provided for the plurality of industrial robots 2 (the controller 6) as an edge computer is disposed, for example, and determination of the operation of the individual industrial robots 2 (the controllers 6) can be made in a centralized manner on the determination apparatus 1, so that it is not necessary to prepare the machine learning device 100 for each industrial robot 2, and hence the operating cost of the machine learning device 100 can be reduced.

While the embodiments of the present invention have been described above, the present invention is not limited to the embodiments described above, and can be implemented in various modes by making appropriate changes.

For example, the above embodiments describe that the determination apparatus 1 and the machine learning device 100 are devices that have different CPUs (processors). However, the machine learning device 100 may be implemented by the CPU 11 included in the determination apparatus 1 and a system program stored in the ROM 12.

What is claimed is:

1. A determination apparatus for determining an operation of an industrial robot that has a function of detecting force and moment applied to a manipulator, the determination apparatus comprising:
a data acquisition unit configured to acquire, as acquired data, at least a state of force and moment applied to a manipulator and a state of a position and a posture in an operation when a force control of the industrial robot is carried out;
an evaluation function creation unit configured to create an evaluation function that evaluates a quality of the operation based on the acquired data;
a determination data creation unit configured to create determination data for the acquired data using the evaluation function created by the evaluation function creation unit;
a preprocessing unit configured to create state data for machine learning based on the acquired data; and
a learning unit configured to generate a learning model for determining a quality of an operation of the industrial robot using the state data and the determination data, wherein
the evaluation function creation unit is further configured to create the evaluation function by determining a weighting coefficient and a threshold value, and
the data acquisition unit is further configured to classify the acquired data into
a category of success that emphasizes carefulness, or
a category of failure relating to a degree of gouging relating to a force applied to a robot portion of the industrial robot or accuracy of the position of the robot portion.

2. The determination apparatus according to claim 1, wherein
the data acquisition unit is configured to create temporary determination data in which a quality of an operation is determined according to time taken for the operation, and
the evaluation function creation unit is configured to create the evaluation function based on the temporary determination data.

3. The determination apparatus according to claim 1, wherein the evaluation function creation unit is further configured to create temporary determination data for classifying each of a plurality of categories into a plurality of subcategories on a standard set by an operator.

4. The determination apparatus according to claim 2, wherein the weighting coefficient and the threshold value are determined so that respective evaluation values calculated at a time match the temporary determination data included in evaluation function creation data.

5. The determination apparatus according to claim 1, wherein
the learning unit is configured to generate the learning model using, as the state data, (a) the state of force and moment applied to the manipulator and (b) the state of the position and the posture in the operation.

6. A determination apparatus for determining an operation of an industrial robot that has a function of detecting force and moment applied to a manipulator, the determination apparatus comprising:
a data acquisition unit configured to acquire, as acquired data, at least a state of force and moment applied to a manipulator and a state of a position and a posture in an operation when a force control of the industrial robot is carried out;
an evaluation function creation unit configured to create an evaluation function that evaluates a quality of the operation based on the acquired data;
a determination data creation unit configured to create determination data for the acquired data using the evaluation function created by the evaluation function creation unit;
a preprocessing unit configured to create state data for machine learning based on the acquired data; and
a learning unit configured to generate a learning model for determining a quality of an operation of the industrial robot using the state data and the determination data, wherein
the evaluation function creation unit is further configured to create the evaluation function by determining a weighting coefficient and a threshold value,
the data acquisition unit is further configured to classify the acquired data into a plurality of categories including success and failure,
a category of success is classified into a plurality of subcategories including a subcategory that emphasizes carefulness, and a category of failure is classified into a plurality of subcategories including a subcategory relating to a degree of gouging relating to a force applied to a robot portion of the industrial robot or accuracy of the position of the robot portion.

* * * * *